United States Patent

[11] 3,609,551

[72] Inventor James M. Brown
Holmdel, N.J.
[21] Appl. No. 741,180
[22] Filed June 28, 1968
[45] Patented Sept. 28, 1971
[73] Assignee Bell Telephone Laboratories, Inc.
Murray Hill, Berkeley Heights, N.J.

[54] DISCRETE-CONTINUOUS COMPANDING FOR A DIGITAL TRANSMISSION SYSTEM
5 Claims, 6 Drawing Figs.

[52] U.S. Cl. .......... 325/38, 332/11, 333/14, 325/62
[51] Int. Cl. .......... H03k 13/22
[50] Field of Search .......... 333/14; 325/38, 38.1, 42, 62; 179/15 AC, 15 AP, 15.55; 332/11 P

[56] References Cited
UNITED STATES PATENTS

| | | | |
|---|---|---|---|
| 3,176,224 | 3/1965 | Lampke | 333/14 |
| 3,339,142 | 8/1967 | Varsos | 325/38 |
| 3,480,948 | 11/1969 | Lord | 332/11 X |

*Primary Examiner*—Richard Murray
*Assistant Examiner*—Benedict V. Safourek
*Attorneys*—R. J. Guenther and E. W. Adams, Jr.

ABSTRACT: A delta modulation transmission system is disclosed in which the message signal is, effectively, compressed at the transmitter and, effectively, complementarily expanded at the receiver. The transmitter includes a variable size step pulse generator to provide the pseudocompression and means are provided to vary the magnitude of the step pulse discretely over a part of the dynamic range of the message signal and continuously over another part of the dynamic range of the message signal.

INVENTOR
J. M. BROWN
BY R. B. Ardis
ATTORNEY

DISCRETE-CONTINUOUS COMPANDING FOR A DIGITAL TRANSMISSION SYSTEM

BACKGROUND OF THE INVENTION

This invention relates generally to a digital transmission system with companding and, more particularly, to a delta modulation transmission system employing companding.

Companding may be employed in a differential pulse code modulation system which suffers from quantizing noise and overload distortion. Quantizing noise is caused by step sizes which are not and cannot be infinitesimally small and can be particularly bothersome under idle circuit conditions when the amplitude of the transmitted message waveform is small. Overload distortion occurs when the step size is not large enough to follow rapid changes in the instantaneous amplitude of the message waveform and can be a major annoyance whenever it occurs. Although it would be possible to reduce quantizing noise by reducing the size of the step signal, overload distortion would then be increased. Similarly, although overload distortion could be reduced by increasing the size of the step signal, such a change would increase quantizing noise.

In one type of differential pulse code modulation system, a delta modulation system, the dilemma can be resolved by the introduction of an appropriate form of companding. In this manner, the dynamic range of the message waveform is reduced by compression at the transmitter and restored by complementary expansion at the receiver. With its dynamic range reduced, the message waveform is less subject to either quantizing noise or overload distortion.

One form of companding has been disclosed in an application by S. J. Brolin, Ser. No. 572,823, filed Aug. 16, 1966, now U.S. Pat. No. 3,461,244, issued Aug. 12, 1969. This patent discloses a continuous companding scheme for use in a delta modulation system. A continuous compandor such as shown in the patent utilizes a step generator which produces step signals whose amplitudes can be varied continuously, as opposed to discretely, over a range of amplitudes. The continuous companding scheme disclosed there is not effective for low level analog message signals.

At low analog signal levels, the decoder at the receiver will fail to accurately track the encoder at the transmitter. This tracking failure gives rise to significant transmission distortion. Thus, the dynamic range of the audio message signal that can be accurately transmitted by the companding scheme described in the aforementioned U.S. Pat. No. 3,461,244, is limited.

In another application by S. J. Brolin, Ser. No. 674,943, filed Oct. 12, 1967, now U.S. Pat. No. 3,500,441, issued Mar. 10, 1970, a discrete companding scheme is disclosed. In that companding scheme, one of several discrete step sizes is used in the encoder to provide compression at the modulator and complementary expansion at the receiver. The signal-to-noise ratio figure for the discrete companding scheme is discontinuous at the discontinuities caused by the discrete step sizes. For both audio and data transmission, this discontinuity in the signal-to-noise ratio figure causes excessive noise in transmission. In addition, the average signal-to-noise ratio over the dynamic range that can be effectively handled by the discrete compandor is lower than the signal-to-noise ratio for the continuous compandor shown in U.S. Pat. No. 3,461,244.

An object of the present invention is to increase the dynamic range of the message signal that can be handled by a continuous companding scheme.

Another object of the present invention is to provide a companding scheme that can accommodate the same dynamic range as the discrete companding scheme with an improved signal-to-noise ratio performance.

SUMMARY OF THE INVENTION

In accordance with the present invention, these objects may be accomplished in a delta modulation transmission system by providing continuous companding for a part of the dynamic range of the message signal and discrete companding for another part of the dynamic range. In particular, discrete companding is provided for low level message signals that cannot be handled by the prior continuous compandor disclosed in U.S. Pat. No. 3,461,244. By combining the discrete companding scheme with the prior art continuous companding scheme, the dynamic range of the combined compandor will be significantly greater than the continuous compandor and will also provide improved signal-to-noise ratio performance over the prior discrete compandor. It has been found, for instance, with one type of companding scheme, that the dynamic range of the combined compandor of the present invention is at least 10 db. greater than the prior art continuous compandor.

DETAILED DESCRIPTION

Figure 1:
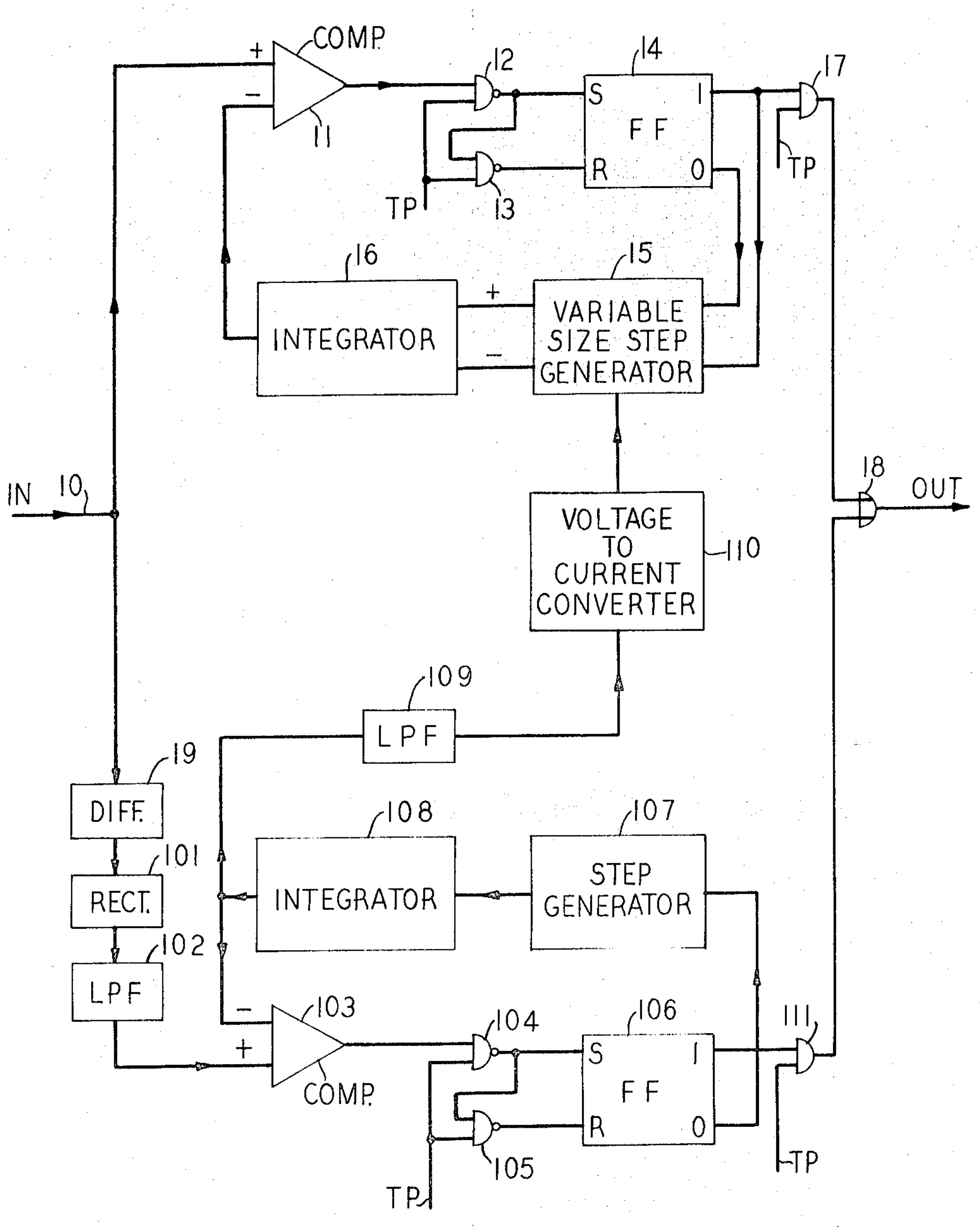
FIG. 1 is a block diagram of a delta modulator which, in accordance with the present invention, combines continuous and discrete companding.

The delta modulator illustrated in FIG. 1 serves both to encode the incoming message waveform and to provide continuous and discrete syllabic compression. As shown, an input line 10 is connected to one input of a comparator 11, which is a two-input circuit delivering an output having the polarity of the difference between its inputs. The output of comparator 11 is connected to a sample-and-hold circuit made up of a pair of inverting AND gates 12 and 13 and a bistable multivibrator or flip-flop 14. The inverting property of AND gates 12 and 13 is indicated symbolically by the small circles at their respective outputs.

As illustrated in FIG. 1, the output of comparator 11 is connected to one input of AND gate 12 and the output of AND gate 12 is connected to one input of AND gate 13. Specified timing pulses are applied to the other inputs of AND gates 12 and 13. Finally, the output of AND gate 12 is connected to the set input S of flip-flop 14, while the output of AND gate 13 is connected to the reset input R.

When the output of comparator 11 in FIG. 1 is positive while a timing pulse is present, AND gate 12 applies binary "1" to the set input of flip-flop 14 and AND gate 13 applies binary "0" to the reset input. Under such conditions, the output state of flip-flop 14 is as illustrated, with binary "1" appearing at the upper or set output and binary "0" appearing at the lower or reset output. When the output of comparator 11 is negative during a timing pulse, AND gate 12 applies binary "0" to the set input of flip-flop 14 and AND gate 13 applies binary "1" to the reset input. Under such conditions, the output state of flip-flop 14 is opposite that illustrated, with binary "0" appearing at the upper or set output and binary "1" appearing at the lower or reset output. By way of example, in both states of flip-flop 14, binary "1" is represented by a positive voltage and binary "0" by zero voltage.

The outputs of flip-flop 14 are connected to respective inputs of a variable size step signal generator 15, which generates a positive step signal when flip-flop 14 is in the state illustrated and a negative signal when flip-flop 14 is in the opposite state. The output of step signal generator 15 is connected to an integrating circuit 16 either by a common lead or by separate positive and negative leads as shown, and the output of integrator 16 is connected to the remaining input of comparator 11. Integrator 16 may include one or more stages of integration as desired.

Output digits of FIG. 1 are taken from the upper or set output of flip-flop 14 and applied to one input of an AND gate 17, the other input of which is supplied with specified timing pulses delayed slightly from those applied to AND gates 12 and 13. The output from AND gate 17 is supplied to the outgoing line for transmission through an OR gate 18.

Except for variable step generator 15, the portion of the apparatus illustrated in FIG. 1 which has thus far been described is a conventional delta modulator. The sample-and-hold circuit samples the output of comparator 11 at a rate sufficiently high to permit the analog message waveform to be reproduced with acceptable accuracy. If the output of comparator 11 is positive, indicating that the instantaneous amplitude of the message waveform on input line 10 is larger than the output of integrator 16, a positive step signal is provided by generator 15 and binary "1" is transmitted through AND gate 17 and OR gate 18. If the output of comparator 11 is negative, indicator that the instantaneous amplitude of the message waveform on line 10 is smaller than the output of integrator 16, the step signal produced by generator 15 is negative and binary "0" is transmitted through AND gate 17 and OR gate 18.

The dynamic range of the delta modulator itself is compressed by adapting the size of the positive and negative step signals produced by generator 15 to both the volume level and the frequency content of the message waveform with an auxiliary or compression delta modulator. Since a delta modulator overloads on slope, a level sensor made up of a differentiator 19, a rectifier 101, and a low-pass filter 102 in tandem is connected from input line 10 to one input of a comparator 103. Comparator 103 is similar to comparator 11 and has its output connected to a sample-and-hold circuit made up of a pair of inverting AND gates 104 and 105 and a flip-flop 106.

The block diagram shown in FIG. 1 of the present application is similar to that shown in FIG. 1 of U.S. Pat. No. 3,461,244. The difference between the present invention and that shown in the prior patent resides in the improvement made in rectifier 101 which permits a discrete step size to be utilized at low analog signal levels. Consequently, the block diagram for the present invention is the same as that shown in the prior application although there is an improvement in rectifier 101.

As illustrated in FIG. 1, the output of comparator 103 is connected to one input of AND gate 104 and the output of AND gate 104 is connected to one input of AND gate 105. Specified timing pulses are applied to the other inputs of AND gates 104 and 105. The output of AND gate 104 is, in addition, connected to the set input S of flip-flop 106, while the output of AND gate 105 is connected to the reset input R. The operation of the sample-and-hold circuit composed of AND gates 104 and 105 and flip-flop 106 is the same as that of the sample-and-hold circuit composed of AND gates 12 and 13 and flip-flop 14.

The lower or reset output of flip-flop 106 is connected to a step signal generator 107, the output of which is in turn connected to an integrator 108. The output of integrator 108 is connected both to the other input of comparator 103 and, through a low-pass filter 109, to a voltage to current converter 110, the output of which is connected to the control terminal of variable size step signal generator 15. To provide complementary control at the associated remote delta demodulator, the upper or set output of flip-flop 106 is connected to an input of an AND gate 111, the output of which is connected to transmitting OR gate 18. The remaining input of AND gate 110 is supplied with specified timing pulses delayed slightly from those applied to AND gates 104 and 105.

The operation of the auxiliary or companding delta modulator shown in FIG. 1 is much the same as that of the main delta modulator. The sample-and-hold gate samples the output of comparator 103. If the output of comparator 103 is positive, indicating that the detected volume level of the message waveform is larger than the output of integrator 108, a positive step signal is provided by generator 107 and binary "1" is transmitted through AND gate 111 and OR gate 18. If the output of comparator 103 is negative, indicating that the detected volume level is smaller than the output of integrator 108, a negative step signal is provided by generator 107 and binary "0" is transmitted through AND gate 111 and OR gate 18. At the same time the output of integrator 108 is applied to low-pass filter 109 to control the size of the step signal provided by generator 15 through voltage-to-current converter 110. As the volume level of the message waveform decreases, the step size decreases.

In the prior continuous compandor disclosed in U.S. Pat. No. 3,461,244, the step size is adjusted in this manner over a 26 db. range from a predetermined minimum. The step size or amplitude is continuously variable over this range. The dynamic range limitations of the prior art continuous compandor derive primarily from the inability of the expandor at the receiver to track the compressor at the transmitter at low levels. This tracking inability causes significant transmission problems.

The output of integrator 108 is a voltage which is compared with the voltage produced by low-pass filter 102. Variable step size generator 15 is responsive to a change in the current level applied to it by voltage-to-current converter 110. Therefore, the upper input of converter 103 follows the voltage at the lower input of comparator 103 and this voltage is converted to a current in converter 110 to control variable size step generator 15.

Figure 2:
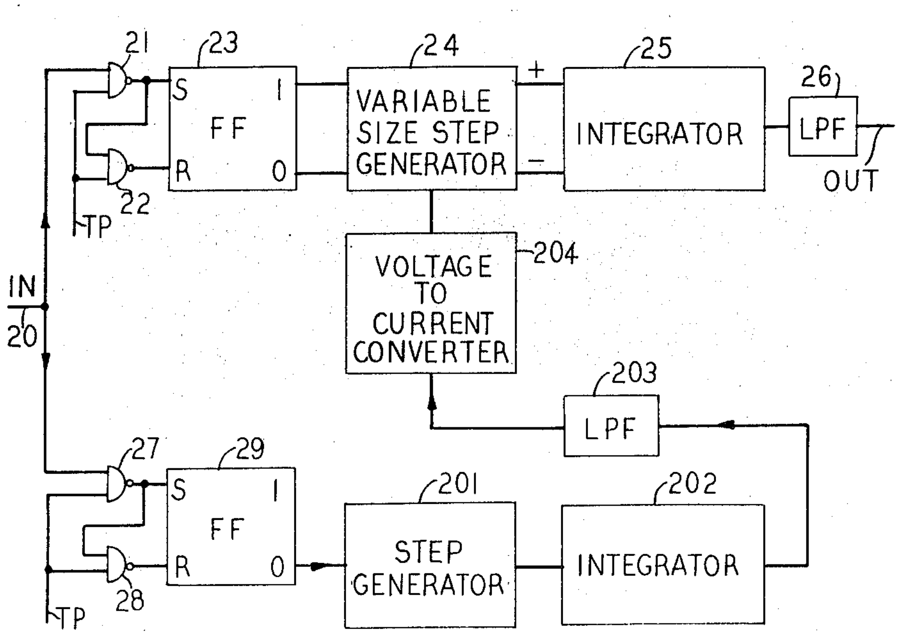
FIG. 2 is a block diagram of a delta demodulator which, in accordance with the present invention, combines continuous and discrete companding.

The delta demodulator illustrated in FIG. 2 serves not only to decode the received message digits and convert them to the original message waveform but also to provide continuous and discrete syllabic expansion. As shown, an input line 20 is connected to a sample-and-hold circuit made up of a pair of inverting AND gates 21 and 22 and a flip-flop 23. Input line 20 is connected to one input of AND gate 21 and the output of AND gate 21 is connected to one input of AND gate 22. The remaining inputs of AND gates 21 and 22 are supplied with specified timing pulses. The output of AND gate 21 is also connected to the set input S of flip-flop 23, and the output of AND gate 22 is connected to the reset input R.

The set and reset outputs of flip-flop 23 in FIG. 2 are connected to respective inputs of variable size step signal generator 24, which is substantially identical to variable size step signal generator 15 in FIG. 1. Step signal generator 24 produces a positive step signal when flip-flop 23 is in the state illustrated and a negative step signal when flip-flop 23 is in the opposite state. The output of step signal generator 24 is connected to an integrator 25, the output of which is connected to a low-pass filter 26 to recreate the originally encoded message waveform. Integrator 25 is substantially identical to integrator 16 in FIG. 1 and, like it, may include one or more stages of integration as desired.

In operation, the incoming binary message digits received on input line 20 cause the sample-and-hold circuit, step generator 24, and integrator 25 in FIG. 2 to track the sample-and-hold circuit, step generator 15, and integrator 16 in FIG. 1. A received binary "1" causes binary "0" to appear at the output of AND gate 21 and binary "1" to appear at the output of AND gate 22. Flip-flop 23 is switched to the state illustrated and step signal generator 24 produces a positive step signal. A received binary "0" causes binary "1" to appear at the output of AND gate 21 and binary "0" to appear at the output of AND gate 22. Flip-flop 23 is switched to the state opposite that illustrated, and step signal generator 24 produces a negative step signal.

The delta demodulator shown in FIG. 2 of the present invention has the same block form representation as the delta demodulator shown in U.S. Pat. No. 3,461,244. Since the improvement over the delta modulator in the prior application is found in rectifier 101, the operation of the delta modulator of FIG. 1 and demodulator of FIG. 2 remains the same as in the patent. In order to accommodate a lower step size for low level analog signals, variable step size generator 24 is provided with a capability of providing the lower step size at the demodulator corresponding to a lower step size produced by variable size step generator 15 in the delta modulator.

The delta demodulator in FIG. 2 is provided with syllabic expansion complementary to the syllabic compression provided the delta modulator in FIG. 1 by an auxiliary or expansion delta demodulator. The received companding digits are selected by yet another sample-and-hold circuit made up of a pair of inverting AND gates 27 and 28 and a flip-flop 29. As illustrated in FIG. 2, input line 20 is connected to one input of AND gate 27, and the output of AND gate 27 is connected to one input of AND gate 28. The remaining inputs of AND gates 27 and 28 are supplied with specified timing pulses. The output of AND gate 27 is also connected to the set input S of flip-flop 29, and the output of AND gate 28 is connected to the reset input R.

The lower or reset output of flip-flop 29 in the delta demodulator in FIG. 2 is connected to a step signal generator 201, which is substantially identical to step signal generator 107 in FIG. 1. The output of step signal generator 201 is connected through an integrator 202, low-pass filter 203 and voltage-to-current converter 204 to the control terminal of variable size step signal generator 24 in the main delta demodulator. In this manner, variable size step signal generator 24 is made to track variable size step signal generator 15 in FIG. 1.

When the received companding digit is binary "1", binary "0" appears at the output of AND gate 27 and binary "1" appears at the output of AND gate 28. Flip-flop 29 is switched to the output state illustrated, with binary "0" appearing at the reset output and step signal generator 201 produces a positive step signal. When the received companding digit is binary "0", binary "1" appears at the output of AND gate 27 and binary "0" appears at the output of AND gate 28. Flip-flop 29 is switched to the state opposite that illustrated, with binary "1" appearing at the reset output and step signal generator 201 produces a negative step signal.

At low levels mistracking may occur between the delta modulator of FIG. 1 and the demodulator of FIG. 2. The mistracking would cause step generator 201, integrator 202 and filter 203 to provide an erroneous control signal to vary the step produced at variable step size generator 24. Consequently, there would be mistracking between the delta modulator and delta demodulator in the transmission system.

Mistracking between the compressor and expandor is caused by the inability to accurately control (to a high degree of precision) DC bias currents, leakage currents of comparator 103, step generator 107, integrator 108 and voltage-to-current converter 110 in the compressor and step generator 201, integrator 202 and voltage-to-current converter 204 in the expandor. At low signal levels, there may also be mistracking between the compressor and output of low-pass filter 102 resulting in a degradation of signal-to-noise ratio.

Figure 3:
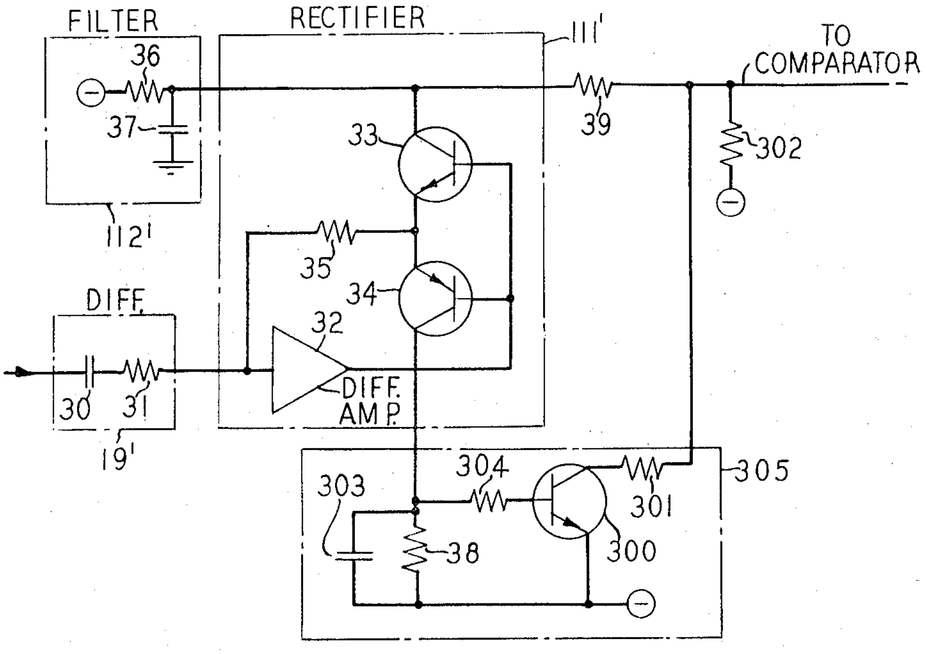
FIG. 3 is a schematic diagram of the continuous-discrete compandor for use in the delta modulator and delta demodulator shown in FIGS. 1 and 2.

FIG. 3 is a schematic diagram of the continuous-discrete compandor which forms the present invention. The message signal is applied to differentiator 19', rectifier 101' and filter 102' connected in tandem. The primed numerals used in FIG. 3 designate the same functional blocks shown in FIG. 1. The output of filter 102' is used to control the voltage which is applied to one input of comparator 103 in FIG. 1.

The message signal is applied to one end of capacitor 30, the other end of which is connected through resistor 31 to differential amplifier 32. Differential amplifier 32 is shown with only one input and is operated as an operational amplifier. The other input to differential amplifier 32 which is not shown would be connected to ground. Rectifier 101', as shown in FIG. 3, is the rectifier that was used in the prior art continuous companding scheme shown in U.S. Pat. No. 3,461,244. Its operation as a rectifier is the same as in the prior application but since the details of the rectifier were not disclosed therein, its operation will now be disclosed since the dynamic range limitations of the prior art continuous compandor are primarily caused by the rectifier.

The output of differential amplifier 32 is applied to the base terminals of NPN transistor 33 and PNP transistor 34. The emitters of NPN transistor 33 and PNP transistor 34 are connected together and returned to the input of differential amplifier 32 through resistor 35. The collector of transistor 33 is connected to a source of positive potential through resistor 36 which forms a part of filter 102'. One end of capacitor 37 is also connected to the collector of transistor 33, while the other end is connected to ground. Resistor 36 and capacitor 37 comprise filter 102'. The collector of transistor 34 is connected to a source of negative potential through resistor 38.

The input terminal of differential amplifier 32 may be considered to be a virtual ground. Thus, the current that flows through capacitor 30 and resistor 31 to the input of differential amplifier 32 must be cancelled by an equal and opposite current flowing through resistor 35. Differential amplifier 32, in order to maintain this condition, will bias either transistor 33 or 34 ON, depending upon the direction of the current flowing through differentiator 19'.

The current flowing through differentiator 19' is determined by the analog message signal applied to its input. Assume the analog message signal causes a current to flow from resistor 31 into differential amplifier 32. This will cause an equal and opposite current to flow through resistor 35. In order for current to flow in the opposite direction, or out of the input of differential amplifier 32, transistor 34 must be biased ON by differential amplifier 32. When transistor 34 is biased ON, no current flows through transistor 33 and its collector is maintained at a predetermined potential.

When a negative analog message signal is applied to the input of differentiator 101', current is caused to flow away from the virtual ground point at the input of differential amplifier 32. Consequently, an equal and opposite current must flow into the input of differential amplifier 32 through resistor 35. In order for this to occur, transistor 33 is biased ON by differential amplifier 32 and current is caused to flow through resistor 36 and transistor 33, thus lowering the voltage at the collector of transistor 33. Therefore, rectifier circuit 101' provides half-wave rectification.

In the prior art companding scheme, when the analog signal level is too low, comparator 103 and voltage-to-current converters 110 and 204 fail to respond accurately. One end of resistor 39 is connected to the collector of NPN transistor 33 and the other end is connected through resistor 302 to a negative source of potential. The interconnection point of resistor 39 and 302 is connected to the lower input of two-input comparator 103. When the analog message signal is too low, an inaccurate voltage is developed at the collector of transistor 33 and also at the interconnection point between resistors 39 and 302. This causes mistracking at the encoder and also causes mistracking at the decoder. This mistracking problem seriously degrades the transmission performance of the digital transmission system.

As described above with reference to FIG. 1, since the prior art continuous compandor fails to respond accurately to low analog signal levels, the variable size step generators 15 at the encoder and 24 at the decoder provide a certain minimum step size in order to achieve compression and complementary expansion. By increasing the companding dynamic ranges of the continuous compandor in accordance with the present invention, the minimum step size may now be decreased for lower analog signal levels that may now be accommodated in the present invention.

In accordance with the present invention, an auxiliary circuit which provides discrete companding for low analog message signals is provided. In particular, when the message signal is below that which could be previously handled by the prior continuous compandor, transistor 300 is maintained in its saturated state thus causing current to flow through resistor 301 and causing the voltage level at the interconnection point of resistors 39 and 302 to maintain a "false" level to cause the demodulator to operate in its more accurate region.

In accordance with the present invention, when transistor 34 is conducting capacitor 303 is charged and maintains its charge so as to bias transistor 300 into saturation. In particular, capacitor 303 is connected across resistor 38. One end of capacitor 303 is connected through resistor 304 to the base of transistor 300, while the other end of capacitor 303 is connected to the emitter of transistor 300. The collector of transistor 300 is connected through resistor 301 to the interconnection point of resistors 39 and 302 and to the lower input of comparator 103 of FIG. 1.

In accordance with the present invention, when the analog message signal is below that which could previously be accommodated accurately by the prior art comparator 103 and voltage-to-current converter 110, the auxiliary control circuit 305 will cause the voltage supplied to the lower input of comparator 103 to discretely vary and cause a minimum size step to be generated in step generator 15. Since the analog message signal that can be handled by the present continuous-discrete companding scheme is lower than that in the prior Brolin patent, a new minimum step size is provided for the lower analog message signal. Since a lower minimum step size is provided, the companding range of the present invention is greater than that of the prior Brolin continuous compandor. When the analog message signal is too low, capacitor 303 will not charge sufficiently to cause transistor 300 to be turned ON. In this state the voltage at the interconnection point of resistors 39 and 302 is too low for comparator 103 and voltage-to-current converter 110 to respond to it and thus, effectively, the analog signal does not contribute to the step size produced by step generator 15.

FIG. 3 illustrates a continuous-discrete compandor which, when used in the delta modulator of FIG. 1, forms an embodiment of the present invention. A form of discrete companding has been added to the prior art continuous compandor in order to extend the dynamic range of the prior art continuous compandor. In addition, the signal-to-noise ratio performance of the combined discrete-continuous companding scheme which is an embodiment of the present invention is better than that of the continuous companding scheme. These last two improvements may more readily be seen by referring to FIGS. 5 and 6 which will be described below.

Figure 4:
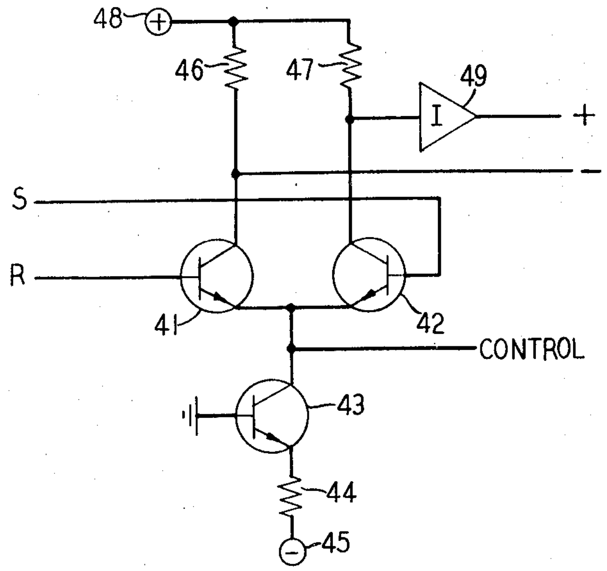
FIG. 4 is a schematic diagram of a variable step signal generator suitable for use in a delta modulator and delta demodulator shown in FIGS. 1 and 2.

A variable size step signal generator suitable for use as generators 15 and 24 in FIGS. 1 and 2, respectively, is illustrated in FIG. 4. As shown, the lower or reset output of the associated sample-and-hold flip-flop is connected to the base of an NPN transistor 41 and the upper or set output is connected to the base of an NPN transistor 42. Transistors 41 and 42 have their emitters connected together and to the collector of an NPN transistor 43. The base of transistor 43 is grounded and the emitter is returned through a resistor 44 to a negative DC biasing source 45. The collectors of transistors 41 and 42 are connected through respective resistors 46 and 47 to a positive DC biasing source 48.

As illustrated, negative outputs are taken directly from the collector of transistor 41 and positive outputs are taken from the collector of transistor 42 through a unity gain inverting amplifier 49. The control lead for fixing the size of the generated step signals is connected to the emitters of transistors 41 and 42 and supplies current into a very high impedance.

The minimum step size is determine d primarily by resistor 44, DC source 45, and the resulting forward bias on the emitter-base junction of transistor 43. When binary "1" appears at the base of transistor 42 and binary "0" at that of transistor 41, the emitter-base junction of transistor 42 is forward biased and the emitter-collector path of that transistor conducts. Current flows from inverting amplifier 49 through the emitter-collector path of transistor 42, causing a similar current to flow out from amplifier 49 into the positive output lead and causing the output of the associated integrator to rise. When the state of the associated sample-and-hold flip-flop is reversed, causing binary "0" to appear at the base of transistor 42 and binary "1" to appear at the base of transistor 41, the emitter-base junction of transistor 41 is forward biased and the emitter-collector path of that transistor conducts. Current flows in from the negative output lead through the emitter-collector path of transistor 41, causing the output of the associated integrator to fall. The size of the step, and hence the rate of the rise or fall of the output of the associated integrator, is determined by the amount of current flowing away from the emitters of transistors 41 and 42 through the control lead plus the minimum bias current. The step size is minimum and the rate of the rise or fall is minimum for zero control current.

In accordance with a feature of the present invention, the value of resistor 44 is increased in comparison with that found in the prior art step signal generator, and a lower minimum step size is provided for low level message signals which could not previously be accommodated in the prior art continuous compandor because of the serious mistracking problems.

Figure 5:
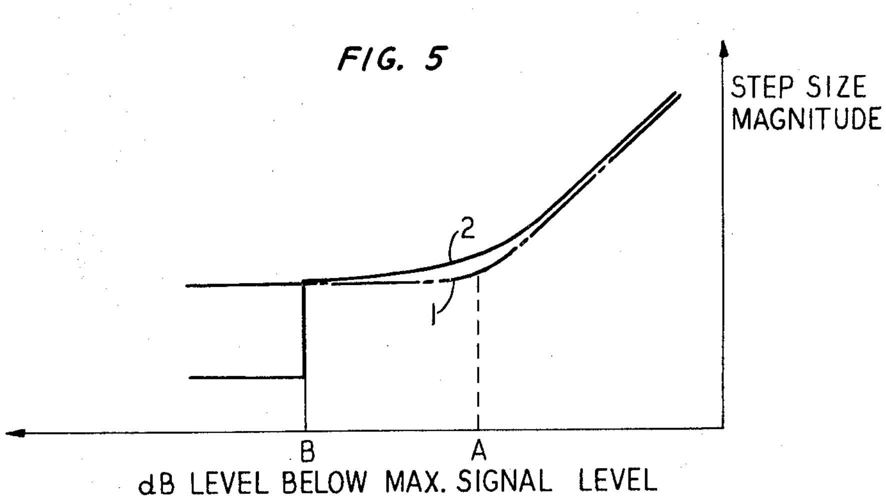
FIG. 5 is a representation of the step size magnitude produced by the variable step signal generator corresponding to the message signal level.

FIG. 5 sets forth the step size magnitude produced by the variable step size generators 15 and 24 in FIGS. 1 and 2, respectively. Curve 1 of FIG. 5 illustrates the step size magnitude in relation to the analog signal level for the prior art continuous companding scheme. Since the step size remains constant below A db., the dynamic range of the continuous compandor is limited to A db. Curve 2 illustrates the step size magnitude in relation to the analog message signal level for the companding scheme of the present invention. As can be seen in curve 2, the dynamic range of the compandor of the present invention is greater than that of the prior continuous compandor. Whereas the prior continuous compandor had its dynamic range limited at A db., the present companding scheme utilizing both continuous and discrete companding, has a dynamic range limited by B db. When the db. level of the message signal rises above B db., the step size magnitude jumps to the same step level as the prior art device. The step size level produced by the present invention continues to rise as the analog message signal increases since additional current is being supplied to comparator 103. Since there is an effective feedback path including comparator 103, sample-and-hold circuit comprising AND gates 104 and 105 and flip-flop 106, step generator 107 and integrator 108, the voltage at the upper lead of comparator 103 attempts to follow the voltage on the lower lead of comparator 103. Therefore, as the voltage into the lower input lead of comparator 103 increases, the voltage output of integrator 108 also increases and is used to increase the step size produced by step size generator 15.

The minimum step size below B db. of the present invention is controlled by resistor 44 of FIG. 4 and when the message signal is below B db. no control current is supplied to the variable step size generator shown in FIG. 4. When the message signal is above the B db. level, auxiliary control circuit 308 of FIG. 3 is activated and supplies enough voltage to bring the step size up to the minimum level of the prior art continuous compandor. As the message signal increases, the voltage level at the comparator is increased and the step size increases. The voltage level at the lower comparator input lead of comparator 103 in FIG. 1 is attempted to be equaled by the voltage at the upper input lead of comparator 103. This voltage passes through low-pass filter 109 and voltage-to-current converter 110 to control the variable size step generator 15 of FIG. 1. Thus, as can be seen in curve 2 of FIG. 5, the dynamic range of the discrete-continuous compandor is greater than the dynamic range of the prior art continuous compandor by an amount equal to the difference between the A and B db. levels.

The relationship between curves 1 and 2 in FIG. 5 demonstrates the increased dynamic range that can be handled by the present invention in relation to that accommodated in the prior art continuous compandor. The present invention also provides significant improvement over the prior art discrete companding scheme disclosed in the aforementioned U.S. Pat.

Figure 6:
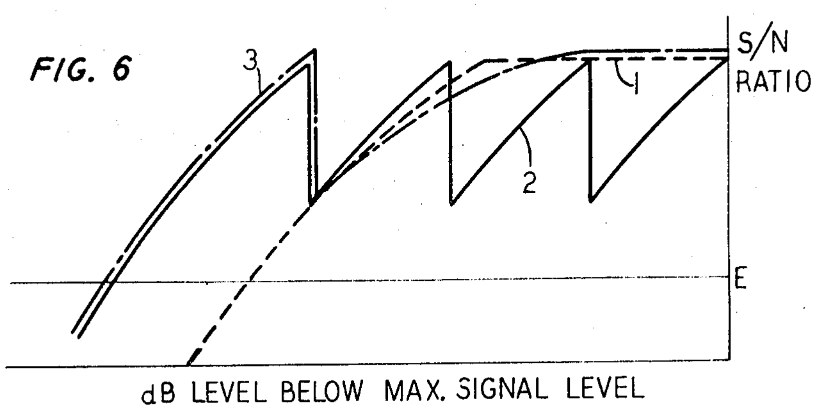
FIG. 6 illustrates the increased dynamic range that can be accommodated in the continuous-discrete companding scheme and illustrates the improved signal-to-noise ratio of the combined continuous-discrete companding scheme over the prior art discrete companding scheme.

No. 3,500,441. FIG. 6 illustrates the signal-to-noise ratio curves for the continuous compandor of the prior art, the discrete compandor of the prior art, and the compandor which forms the present invention.

Curve 1 represents the signal-to-noise ratio for the continuous compandor, curve 2 represents the signal-to-noise ratio curve for the prior art discrete compandor, and curve 3 illustrates the signal-to-noise ratio figure for the present invention.

The dynamic range of the present invention is significantly greater than that of the prior art continuous compandor as illustrated in FIG. 5. Further, the dynamic range is increased in accordance with the present invention by providing a discrete step pulse for low level message signals. As is clear from FIG. 6, the acceptable db. level below maximum signal level is greater for curve 3 than curve 1. The acceptable signal-to-noise ratio is designated by the letter E. Below level E the signal-to-noise ratio is unacceptable for proper transmission performance.

Curve 2 illustrates the signal-to-noise ratio for the discrete compandor of the prior art. As can be seen, curve 2 is jagged and, for data transmission, the abrupt changes in the signal-to-noise ratio can cause significant transmission error. When the signal-to-noise ratio abruptly changes, it is as though a noise generator was being placed in the transmission path. For data transmission this can be particularly serious. In addition, the average signal-to-noise ratio of curve 2 is lower than that of the present invention.

Curve 3 follows the signal-to-noise ratio for the prior art continuous compandor but at low signal levels follows the signal-to-noise ratio of the prior art discrete compandor. Thus, significantly fewer discontinuities are encountered in the signal-to-noise ratio of the present invention as compared with the prior art discrete compandor.

FIG. 5 illustrates a visual representation of the improvement in the companding range by utilizing the principles of the present invention while FIG. 6 illustrates the increase in the dynamic range of the analog message signal that can be accommodated using the principles of the present invention. The visual illustrations in FIGS. 5 and 6 graphically demonstrate the significant improvements of the present invention when compared with the prior art continuous and discrete compandors.

It is to be understood that the above-described arrangements are illustrative of the application of the principles of the invention. Numerous other arrangements may be devised by those skilled in the art without departing from the spirit and scope of the invention.

I claim:

1. A delta modulator with syllabic compression of an analog message signal comprising:

a comparator having a single output and a pair of inputs,
means to sample the output of said comparator,
an output transmitter and a step signal generator both connected to respond to the sampled output of said comparator,
said output transmitter producing a binary digit of one kind for transmission whenever the sample is positive and a binary digit of another kind for transmission whenever the sample is negative,
said step signal generator producing a signal of one polarity when the sample is positive and a signal of the opposite polarity when the sample is negative,
an integrator connected to receive the signal produced by said step signal generator,
means to supply the input signal and the output of said integrator to the respective inputs of said comparator,
and first means to vary the magnitude of the signal produced by said step signal generator continuously over a part of the dynamic range of the message signal characterized by second means to vary the magnitude of the signal produced by said step signal generator discretely over another part of the dynamic range of the message signal.

2. Apparatus as set forth in claim 1 further including:

means to maintain the magnitude of the signal produced by said step signal generator constant when the magnitude of the message signal is below a first level,
said second means causing the magnitude of the signal produced by said step signal generator to change discontinuously when the magnitude of said message signal is at said first level,
and said first means causing the magnitude of the signal produced by said step signal generator to vary continuously when the message signal is above a second level which is higher than said first level.

3. A delta modulation transmission system with syllabic compression of an analog message signal at a delta modulator and complementary syllabic expansion at a delta demodulator with said delta modulator comprising:

a comparator having a single output and a pair of inputs,
means to sample the output of said comparator,
an output transmitter and a first step signal generator both connected to respond to the sampled output of said comparator,
said output transmitter producing a binary digit of one kind for transmission whenever the sample is negative,
said first step signal generator producing a signal of one polarity when the sample is positive and a signal of the opposite polarity when the sample is negative,
a first integrator connected to receive the signal produced by said step signal generator,
means to supply the input signal and the output of said first integrator to the respective inputs of said comparator, and
first means to vary the magnitude of the signal produced by said first step signal generator continuously over a part of the dynamic range of the message signal characterized by second means to vary the magnitude of the signal produced by said first step signal generator discretely over another part of the dynamic range of the message signal,
a delta demodulator comprising:
a second step signal generator connected to respond to binary digits received from said output transmitter,
said second step signal generator producing a step signal of one polarity whenever the received binary digit is of one kind and a step signal of the opposite polarity whenever the received binary digit is of the other kind,
a second integrator connected to receive the step signal produced by said second step signal generator,
a low-pass filter connected to the output of said second integrator connected to recreate the message waveform encoded at said transmitting terminal, and
means to vary the magnitude of the step signal produced by said second step signal generator in synchronism with the variation of the step signal produced by said first step signal generator.

4. Apparatus as set forth in claim 3 wherein said delta modulator further includes means to maintain the magnitude of the signal produced by said first step signal generator constant when the magnitude of the message signal is below a first level,
said second means causing the magnitude of the signal produced by said first step signal generator to change discontinuously when the magnitude of said message signal is at said first level,
and said first means causing the magnitude of the signal produced by said first step signal generator to vary continuously when a message signal is above a second level which is higher than said first level.

5. In a digital transmission system employing compression of the message signal at the transmitter and complementary expansion at the receiver, said transmitter comprising:

a modulator, said modulator having
a step signal generator which provides a step signal for use in said modulator,
means responsive to the message signal for controlling the output of said step signal generator, comprising, first means for varying the magnitude of the signal produced by said step signal generator continuously over a part of the dynamic range of the message signal, said first means being characterized by second means for varying the magnitude of the signal produced by said step signal generator discretely over another part of the dynamic range of the message signal, means to maintain the magnitude of the signal produced by said step signal generator constant when the magnitude of the message signal is below a first level, said second means causing the magnitude of the signal produced by said step signal generator to change discontinuously when the magnitude of said message signal is at said first level, said first means causing the magnitude of the signal produced by said step signal generator to vary continuously when the message signal is above a second level which is higher than said first level, said first means comprising an amplifier, a storage circuit connected to said amplifier to cause said amplifier to be turned OFF when said message signal is below said first level and to cause said amplifier to conduct when said message signal rises above said first level.